H. F. CLARK.
GLASS DRAWING BAIT.
APPLICATION FILED AUG. 23, 1918.
1,324,229.
Patented Dec. 9, 1919.
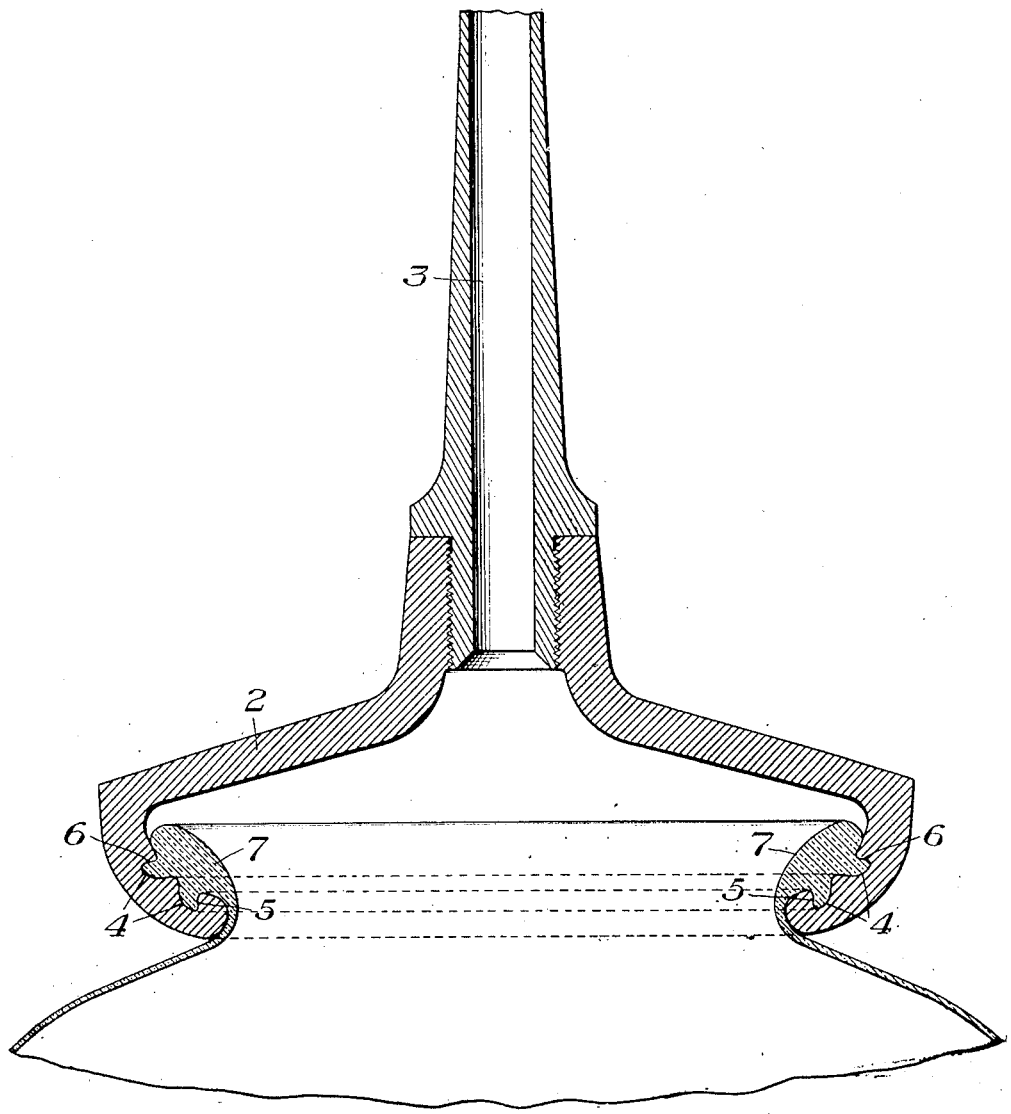
WITNESSES
INVENTOR

UNITED STATES PATENT OFFICE.

HENRY F. CLARK, OF OAKMONT, PENNSYLVANIA, ASSIGNOR TO WINDOW GLASS MACHINE COMPANY, OF PITTSBURGH, PENNSYLVANIA, A CORPORATION OF NEW JERSEY.

GLASS-DRAWING BAIT.

1,324,229.     Specification of Letters Patent.     Patented Dec. 9, 1919.

Application filed August 23, 1918. Serial No. 251,100.

*To all whom it may concern:*

Be it known that I, HENRY F. CLARK, a citizen of the United States, residing at Oakmont, Allegheny county, Pennsylvania, have invented a new and useful Improvement in Glass-Drawing Bait, of which the following is a full, clear, and exact description, reference being had to the accompanying drawing, forming part of this specification, in which—

The figure is a vertical section of a glass drawing bait embodying my invention.

My invention has relation to glass drawing baits, and is designed to provide an improved form of bait which will prevent the article being drawn from pulling out of the bait; and which will also prevent relative movement between the bait and the engaged portion of the glass during the draw together with the looseness resulting from such movement. Such looseness is objectionable for two reasons:—First, it is apt to cause leakage of the air from within the article, which is highly objectionable. The air pressure in the article is but slightly above atmospheric and must be under perfect control during the draw. This is not possible if air leakage, especially of irregular character, exists between the glass and the bait. Second, any looseness or play of the article in the bait greatly increases the tendency to breakage in taking down the drawn cylinders with the bait attached thereto.

In accordance with my invention, I provide a hollow bait 2, at the lower end of the blow-pipe 3. On the inner glass engaging surface of this bait I form a plurality of annular grooves 4. These grooves are preferably two in number, although more or less may be employed. I preferably undercut the lower wall of the lower groove, as indicated at 5, and similarly undercut the upper wall of the upper groove, as indicated at 6. In this manner, the lower groove acts to prevent radial inward movement of the novel 7 of the glass cylinder, while the upper groove effectively prevents the novel form moving outwardly or upwardly.

In use, the bait is preferably immersed in the glass bath to a sufficient depth to cause a considerable mass of glass to form over the grooves 4, relative to the thickness of the neck portion 8 of the novel. This relatively thin neck portion, by reason of its thinness and its exposure to the air will cool more quickly than the thicker head portion; the bait acting as a heat-retainer for the latter. Consequently there is very little tendency of the bait and novel head to move relatively to each other during a draw. This is particularly true if the bait is used in the manner described and claimed in the patent to Otis A. Wells, No. 1,301,771, dated April 22, 1919, in which the bait is given a relatively high temperature, short of that at which the glass will fuse to the bait, before it leaves the bath in making a draw.

It will be apparent that my bait gives a very secure anchorage for the novel in starting a draw, as well as throughout the draw, making it practically impossible for the head or novel to pull out. At the conclusion of the draw, the novel, while not fused to the bait, will be found to be practically free from looseness. This, together with the interlocking action of the grooves 4, causes the novel to be practically sealed against the escape of air during the draw.

The bait may be made of any usual or suitable metal or alloy such as heretofore employed. The number and form of the grooves 4 may be changed as may also the angle of the inner novel-supporting surface of the bait; and other changes may be made without departing from the spirit and scope of my invention as defined in the appended claims.

I claim:

1. A glass-drawing bait having an internal novel supporting surface surrounding an unobstructed circular opening, the novel-supporting surface being provided with a plurality of grooves, substantially as described.

2. A glass-drawing bait having an interior novel-supporting surface surrounding an unobstructed circular opening and provided with a plurality of concentric grooves, substantially as described.

3. A glass-drawing bait having its interior novel-supporting surface provided with a plurality of concentric grooves, said grooves having undercut walls, substantially as described.

4. A glass-drawing bait having its interior novel-supporting surface provided with a plurality of concentric grooves, said grooves having opposite walls oppositely undercut, substantially as described.

5. A glass-drawing bait having an internal novel-supporting surface provided with a plurality of grooves, said grooves being arranged to provide an interlocking engagement between the glass and metal to prevent any relative movement thereof, substantially as described.

In testimony whereof I have hereunto set my hand.

HENRY F. CLARK.